May 7, 1929.  S. L. TEMPLE  1,711,621
TOOTHBRUSH
Filed Oct. 3, 1927
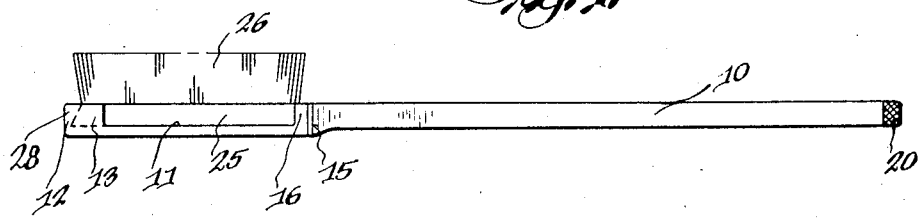
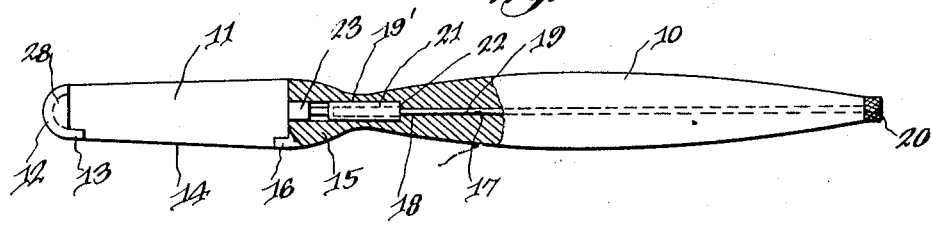
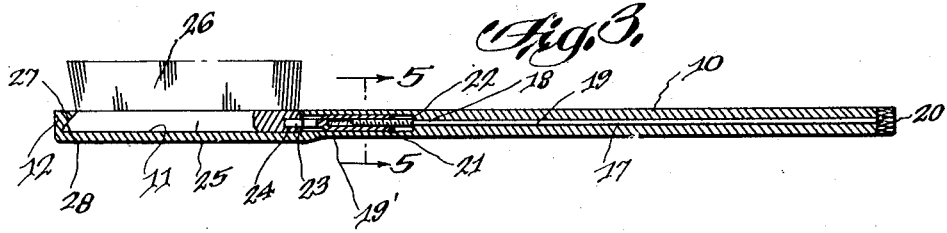
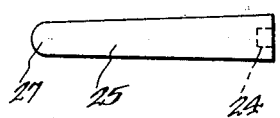 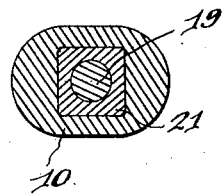
Samuel L. Temple
INVENTOR
BY Victor J. Evans
ATTORNEY Patented May 7, 1929.

1,711,621

UNITED STATES PATENT OFFICE.

SAMUEL L. TEMPLE, OF CHICAGO, ILLINOIS.

TOOTHBRUSH.

Application filed October 3, 1927. Serial No. 223,723.

This invention relates to certain novel improvements in tooth brushes and has for its principal object the provision of an improved construction of this character which will be highly effiecient in use and economical in manufacture One of the several objects of the invention resides in the novel manner for removably securing the head of the bristle bearing member with the handle of a tooth brush whereby when the head becomes worn beyond use or unsanitary the same may be removed and a new head substituted thus providing a tooth brush that will be sanitary and convenient to use and economical in manufacture.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is an edge view of the invention,

Fig. 2 is a bottom plan view of the same showing the bristle bearing head removed, Fig. 3 is a longitudinal sectional view of the same, Fig. 4 is a plan view of the bristle bearing head embodied in the invention, and Fig. 5 is a sectional detailed view taken substantially on line 5—5 of Fig. 3.

Referring more particularly to the drawing my improved tooth brush includes a handle 10. This handle 10 may be formed of any well known material and at one end portion the handle provides a socket 11. This socket 11 includes a wall 12. This wall 12 has one end portion 13 extending to a point upon but not across the longitudinal edge 14 of the socket whereby to provide a stop for reasons hereinafter set forth. The opposite end 15 of the socket also provides a wall portion 16 which extends to a point upon the longitudinal edge 14 opposite the wall portion 13 to likewise provide a stop for reasons hereinafter set forth. The handle 10 has formed therein a longitudinally extending bore 17 terminating its inner end portion 18 into a bore 19' of a larger diameter and extending through the bore 17 is a feed screw 19 carrying at its outer end portion a knurled thumb nut 20. The feed screw 19 extends into a nut 21 slidably positioned in the bore 19'. This portion of the feed screw which operates upon the nut 21 is of a larger diameter than the diameter of the remaining portion of the feed screw whereby this enlarged portion will engage the shoulder 22 and prevent displacement of the feed screw. The nut 21 has an extended portion providing a lock lug 23 adapted to be moved into a recess 24 formed in the head 25 carrying the usual bristles 26.

The head 25 at its edge 27 is circled and beveled out and down to fit into the circular beveled edge 28 of the wall 12 whereby to prevent displacement of the head from the socket at its longitudinal opening. When the head is positioned in the socket it is prevented from displacement at one side of the socket by the wall portions 13 and 16. When the head is positioned in the socket the recess 24 will be aligned with the bore 19'. By turning the nut 20 to rotate the screw 19 in a clockwise direction the lug 23 will be forced into the opening to releasably hold the head in the socket. To remove the head the feed screw is rotated in an anticlockwise direction to remove the lug from the engagement in the opening. When the lug 23 is in the opening the rounded edge portion of the head will be wedged against the wall 12 and the head held firmly during use.

While I have illustrated and described the preferred form of construction for carrying my invention into effect, this is capable of variation and modification, without departing from the spirit of the invention. I, therefore do not wish to be limited to the precise details of construction set forth, but desire to avail myself of such variation and modification as come within the scope of the appended claims.

Having thus described my invention what I claim as new and desire to protect by Letters Patent is:

1. A tooth brush including a handle having a socket formed therein at one end thereof and having a longitudinally extending bore formed therein including an enlarged portion in the section thereof opening into said socket, the wall of said socket opposite said bore embodying an inwardly directed taper, a bristle bearing head having the tapered end portion adapted to co-operate with the taper of said socket end wall and having an opening extending thereinto in the end thereof opposite said tapered edge that is adapted to be aligned with said bore, a sleeve in the enlarged portion of said bore having screw threads on the inner periphery thereof, and a rod member having screw threads on the inner end thereof adapted to engage the screw threads in said sleeve, said rod having an enlarged head thereon adapted to engage the outer end of said handle to prevent inward movement of said rod whereby when said rod member is rotated in a given direction said sleeve will be moved into said opening to retain said head in said socket.

2. A tooth brush including a handle having a socket formed therein at one end thereof and having a longitudinally extending bore formed therein including an enlarged portion in the section thereof opening into said socket, the wall of said socket opposite said bore being rounded outwardly and embodying an outwardly directed taper, said handle providing stop lugs along one edge of said socket, a bristle bearing head having a rounded tapered end portion adapted to co-operate with the rounded taper of said socket end wall and having an opening formed in the opposite end thereof adapted to be aligned with said bore, said head engaging said stop lugs to insure said alignment, a sleeve in the enlarged portion of said bore having screw threads on the inner periphery thereof, and a rod member having screw threads on the inner end thereof adapted to engage the screw threads in said sleeve, said rod having an enlarged head thereon adapted to engage the outer end of said handle to prevent inward movement of said rod whereby when said rod member is rotated in a given direction said sleeve will be moved into said opening to retain said head in said socket.

In testimony whereof I affix my signature.

SAMUEL L. TEMPLE.